No. 861,592. PATENTED JULY 30, 1907.
C. O. JOHNSON.
ROLLER BEARING.
APPLICATION FILED NOV. 16, 1906.
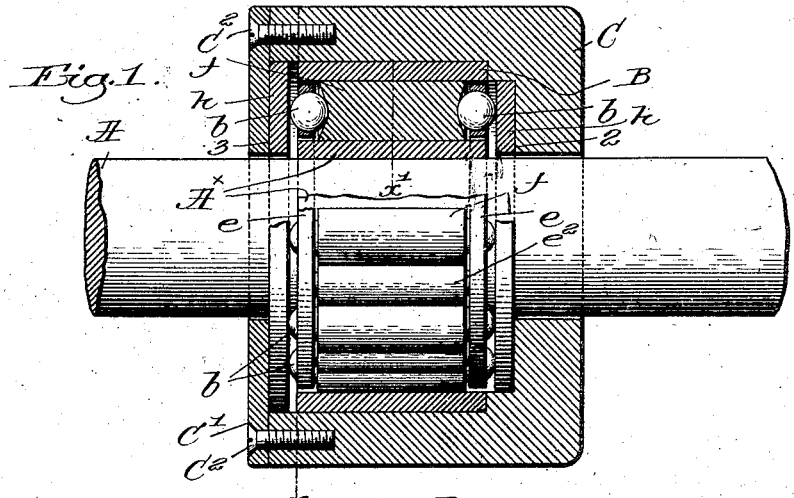
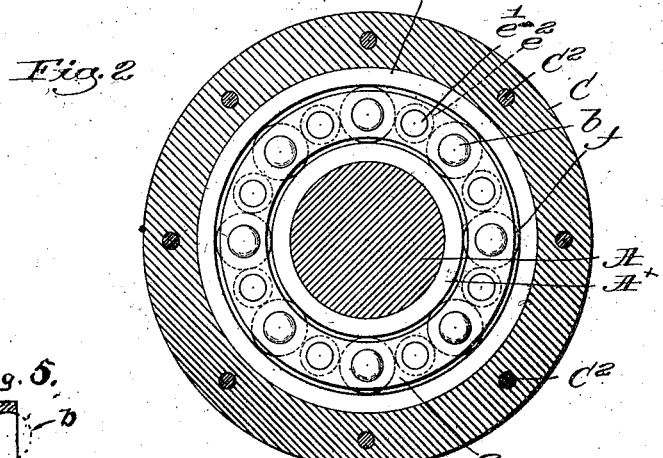
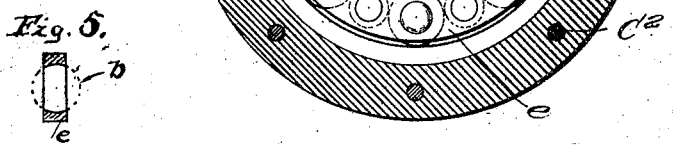
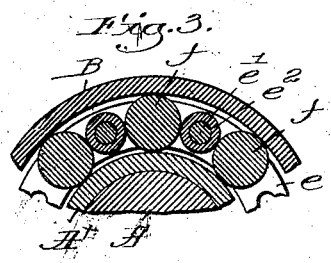
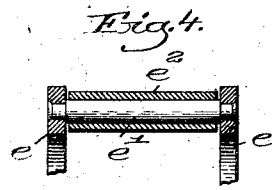
Witnesses:
Fred S. Greenleaf.
Joseph M. Ward.
Inventor.
Charles O. Johnson,
by Crosby Gregory
Attys.

UNITED STATES PATENT OFFICE.

CHARLES O. JOHNSON, OF BOSTON, MASSACHUSETTS.

ROLLER-BEARING.

No. 861,592.   Specification of Letters Patent.   Patented July 30, 1907.

Application filed November 16, 1906. Serial No. 343,698.

*To all whom it may concern:*

Be it known that I, CHARLES O. JOHNSON, a citizen of the United States, residing in Boston, county of Suffolk, and State of Massachusetts, have invented an Improvement in Roller-Bearings, of which the following description, in connection with the accompanying drawing, is a specification, like letters on the drawing representing like parts.

This invention has for its object the production of a novel, serviceable, and durable bearing of the roller and ball type.

The novel bearing shown as embodying my invention comprises a rigid cage provided with a series of bearing rollers cupped at their ends to receive balls that are sustained in the line of the longitudinal axes of said rollers, the end walls of the cage opposite the ends of said rollers being provided with through and through holes or openings of slightly less diameter than the diameter of the single ball sustaining each end of said bearing roller, so that a part of each ball projects beyond the outer sides of the cage walls where they serve to resist end thrust, and to maintain these bearing rolls in their correct operative relation, and with their longitudinal axes in parallelism with the longitudinal axis of the shaft, I have combined with said bearing rollers a series of guiding rollers that contact with the exteriors of the bearing rollers and moving therewith also act to space the bearing rollers, aiding in further preserving their parallelism.

Figure 1 shows in section a box and housing surrounding an axle the latter being shown in elevation, the upper part of the roller carrying cage being broken out showing one of the bearing rollers in section; Fig. 2 is a section in the line $x$, Fig. 1, with the balls in elevation; Fig. 3 is a partial section in the line $x'$, Fig. 1; and Fig. 4 is a section through the cage in line with one of its ties and the roller sustained thereby. Fig. 5 is an enlarged detail showing the part of the cage end with a ball-receiving space therein.

The shaft or axle A, Fig. 1, in practice will have thereon a sleeve-like portion $A^x$, and I have shown the axle surrounded by a box B shown as incased in a housing C which may be of any usual shape.

The cage is composed of two end rings $e, e$, provided with holes for the reception of tie-rods $e'$ the ends of which, extended through the holes in the rings, are upset or fixed therein to thus provide a rigid cage. Supported by the cage are a plurality of guide rollers $c^2$ of less diameter externally than the distance between the exterior of the axle A and the inner wall of the surrounding box B, said guide rollers $c^2$ being positioned so that they do not engage either the housing B or the sleeve $A^x$. These guide rollers may be supported by the rings $e$ of the cage in any suitable way and in the present embodiment of my invention they are loosely mounted on the tie-rods $e'$. This manner of supporting them is not essential however.

Between the guide-rolls $c^2$ I mount in the cage a series of bearing rollers $f$ of a diameter to contact with the exterior of the axle or the steel shell surrounding the same and forming part of said axle, and the interior of the surrounding box B, as shown in Fig. 3, said rollers also contacting with the rollers $c^2$, the latter rollers serving to aline and keep the bearing rollers $f$ in true parallel position and maintain the longitudinal axis of each bearing roller parallel with the longitudinal axis of the axle.

In accordance with my invention, the cage rings or ends have through-and-through holes, as shown in Fig. 1, where the cage is broken out, and the opposite end of the bearing rollers $f$ are cupped or concaved, as shown in said figure, to receive balls $b$. The through-and-through holes in the cage are a trifle smaller at the outer sides of the cage than the diameter of the balls $b$ so that said balls cannot escape outwardly through the cage ends. At each end of the cage I have interposed between the walls 2, 3, of the housing anti-friction washers $h, h$, against which the balls $b$ bear as the shaft or box and its housing are rotated. The object of these washers is to take the wear but they could be omitted and the balls allowed to bear directly against the housing C without departing from the invention.

When assembling the cage, it will be understood that the balls and bearing rollers are positioned in the cage before the tie-rods $e'$ are upset, and after upsetting these rods to connect the end rings of the cage rigidly, the bearing rollers and balls cannot drop out. The cage connected by the tie-rods and provided with the bearing rollers sustained at each end by a single ball $b$ is slipped over the axle and within the box B surrounded by the housing. The cage may be held in the housing by any proper means such as the face plate C′, which is shown as removably connected to the body of the housing by screws $C^2$. The space within the housing occupied by the cage is just sufficient to permit a slight motion endwise thereof and its balls $b$ between the end bearing surfaces. When the axle or box are rotated in the use of the bearing, the bearing rollers $f$ contact with the interior of the box and the exterior of the axle or the steel shell surrounding the same and forming part of said axle, and whichever member is rotated, the bearing rollers obviate friction.

By arranging the balls $b$, as shown, it will be readily understood that wear, due to what is known as end thrust, which would result if the cage ends should strike directly against the washers as either the box or axle move horizontally, is overcome by the contact of the balls when extended through the holes in the cage ends with the washers, the balls contacting with one or the other washer. The rollers $c^2$, see Fig. 3, contact with the bearing rollers at each side, and said rollers are rotated by their contact with the bearing rollers, the bearing rollers being rotated by whichever member A or B is rotated positively.

My invention would not be departed from if the rollers $b$ rolled over the faces 2, 3, of the housing instead of over said washers as above explained.

Having described my invention what I claim as new and desire to secure by Letters Patent is:—

A roller-bearing comprising an axle, a housing, a cage the end walls of which are provided with a series of through and through openings, balls located in said openings, a series of bearing rollers cupped at their ends, and sustained in said cage by the balls in said openings, combined with a series of guide-rollers sustained between the end walls of said cage, said guide-rollers contacting with said bearing-rollers as the latter are rotated in the movement of the cage, the bearing-rollers rotating the guide-rollers.

In testimony whereof, I have signed my name to this specification, in the presence of two subscribing witnesses.

CHARLES O. JOHNSON.

Witnesses:
LOUIS C. SMITH,
MARGARY A. DUNN.